(12) United States Patent
Shin et al.

(10) Patent No.: US 12,046,146 B2
(45) Date of Patent: Jul. 23, 2024

(54) MUSIC LEARNING APPARATUS AND MUSIC LEARNING METHOD USING TACTILE SENSATION

(71) Applicant: ELECTRONICS AND TELECOMMUNICATIONS RESEARCH INSTITUTE, Daejeon (KR)

(72) Inventors: Sungyong Shin, Daejeon (KR); Hyung Cheol Shin, Daejeon (KR); Changmok Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 354 days.

(21) Appl. No.: 17/502,731

(22) Filed: Oct. 15, 2021

(65) Prior Publication Data

US 2022/0230555 A1    Jul. 21, 2022

(30) Foreign Application Priority Data

Jan. 18, 2021  (KR) .......................... 10-2021-0006643

(51) Int. Cl.
  *G09B 15/00*  (2006.01)
  *G09B 21/00*  (2006.01)
  *G10H 1/00*  (2006.01)
  *G10L 21/16*  (2013.01)
  *G10L 25/90*  (2013.01)

(52) U.S. Cl.
  CPC .......... *G09B 15/00* (2013.01); *G09B 21/009* (2013.01); *G10H 1/0008* (2013.01); *G10L 21/16* (2013.01); *G10L 25/90* (2013.01); *G10H 2210/061* (2013.01); *G10H 2210/066* (2013.01)

(58) Field of Classification Search
  CPC ............. G09B 15/00; G10H 2210/061; G10H 2210/066; G10L 25/90; G10L 21/16
  See application file for complete search history.

(56) References Cited

U.S. PATENT DOCUMENTS

| 10,755,683 | B1* | 8/2020 | Baltazor | G10H 1/368 |
| 10,921,892 | B2* | 2/2021 | Khwaja | H04R 3/12 |
| 10,978,033 | B2* | 4/2021 | Lathrop | G10G 1/02 |
| 11,302,212 | B1* | 4/2022 | Davis | G10G 1/02 |
| 2006/0246407 | A1 | 11/2006 | Kang et al. | |
| 2016/0100239 | A1 | 4/2016 | Shin et al. | |

(Continued)

FOREIGN PATENT DOCUMENTS

| KR | 10-2006-0112633 | 11/2006 |
| KR | 10-0928152 | 11/2009 |

(Continued)

*Primary Examiner* — Robert W Horn
(74) *Attorney, Agent, or Firm* — KILE PARK REED & HOUTTEMAN PLLC (57) ABSTRACT

A tactile music learning apparatus converts sound data of a user's voice corresponding to original music into first tactile data including tactile information, generates a synchronized tactile pattern by synchronizing the first tactile data with second tactile data including tactile information corresponding to sound data of the original music, and transfers the synchronized tactile pattern to a tactile reproducing apparatus to allow the tactile reproducing apparatus to reproduce the synchronized tactile pattern.

15 Claims, 8 Drawing Sheets

(56) References Cited

U.S. PATENT DOCUMENTS

2018/0315343 A1\* 11/2018 Shvartzberg ......... G09B 21/009
2019/0295443 A1    9/2019 Shin et al.
2022/0230555 A1\*  7/2022 Shin ...................... G09B 15/00

FOREIGN PATENT DOCUMENTS

KR   10-2014-0147254    12/2014
KR   10-2020-0122894    10/2020

\* cited by examiner

MUSIC LEARNING APPARATUS AND MUSIC LEARNING METHOD USING TACTILE SENSATION

CROSS-REFERENCE TO RELATED APPLICATION

This application claims priority to and the benefit of Korean Patent Application No. 10-2021-0006643 filed in the Korean Intellectual Property Office on Jan. 18, 2021, the entire contents of which are incorporated herein by reference.

BACKGROUND

(a) Field

The described technology relates to a music learning apparatus and a music learning method using tactile sensation.

(b) Description of the Related Art

Existing song practice systems or online music learning systems outputs accompaniment and melody through sound and also output visual information of pitch and lyrics, thereby assisting users in singing practice.

However, when hearing-impaired persons who cannot hear sound or has relatively weak sound recognition use such systems, they have difficulty in learning the melody of the song because it is difficult to match the pitch of the song with the pitch of their own voices. Therefore, the hearing-impaired persons do not enjoy the advantage of online music learning that can independently learn music.

SUMMARY

Some embodiments may provide a music learning apparatus and a music learning method using tactile sensation, capable of learning music through tactile sensation.

According to an embodiment, a music learning apparatus using tactile sensation may be provided. The music learning apparatus using tactile sensation may include a memory configured to store one or more instructions and a processor configured to execute the one or more instructions. The processor, by executing the one or more instructions, may convert sound data of a user's voice corresponding to original music into first tactile data including tactile information, generate a synchronized tactile pattern by synchronizing the first tactile data with second tactile data including tactile information corresponding to sound data of the original music, and transfer the synchronized tactile pattern to a tactile reproducing apparatus to allow the tactile reproducing apparatus to reproduce the synchronized tactile pattern.

In some embodiments, in response to the original music not including the second tactile data, the processor may convert the sound data of the original music into the second tactile data.

In some embodiments, the processor may receive the original music including the second tactile data.

In some embodiments, the tactile information of the first tactile data may correspond to a pitch of the sound data of the user's voice.

In some embodiments, the processor may extract a main melody from the sound data of the user's voice and extract the pitch from the main melody.

In some embodiments, the processor may convert the main melody into frequency information and extract the pitch based on frequency analysis of the frequency information.

In some embodiments, the processor may generate the synchronized tactile pattern including a tactile pattern corresponding to the first tactile data to be reproduced at a first position of the tactile reproducing apparatus and a tactile pattern corresponding to the second tactile data to be reproduced at a second position of the tactile reproducing apparatus, in response to a pitch of the sound data of the original music not matching a pitch of the sound data of the user's voice.

In some embodiments, the processor may generate the synchronized tactile pattern including a tactile pattern to be reproduced at a single location of the tactile reproducing apparatus, in response to the pitch of the sound data of the original music matching the pitch of the sound data of the user's voice.

In some embodiments, an intensity of the tactile pattern to be reproduced in response to the pitch of the sound data of the original music matching the pitch of the sound data of the user's voice may be greater than an intensity of the tactile pattern to be reproduced in response to the pitch of the sound data of the original music not matching the pitch of the sound data of the user's voice.

In some embodiments, the tactile pattern may be reproduced by vibration in the tactile reproducing apparatus.

According to another embodiment, a music learning method using tactile sensation performed by a computing device may be provided. The music learning method using tactile sensation includes receiving sound data corresponding to original music from a user, converting the sound data of the user into first tactile data including tactile information, generating a synchronized tactile pattern by synchronizing the first tactile data with second tactile data including tactile information corresponding to sound data of the original music, and transferring the synchronized tactile pattern to a tactile reproducing apparatus to allow the tactile reproducing apparatus to reproduce the synchronized tactile pattern.

In some embodiments, the music learning method using tactile sensation may further include converting the sound data of the original music into the second tactile data in response to the original music not including the second tactile data.

According to yet another embodiment, a tactile music producing apparatus including a memory configured to store one or more instructions and a processor configured to execute the one or more instructions. The processor, by executing the one or more instructions, may extract a pitch from sound data of music content, convert the pitch into tactile data including tactile information, and synchronize the sound data and the tactile data to generate tactile music data.

According to some embodiments, since music content and a user's voice are synchronized and transferred as tactile sensation, hearing-impaired persons can practice music even if they cannot hear the music or their own voices.

DETAILED DESCRIPTION OF THE EMBODIMENTS

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

As used herein, the singular forms "a", "an" and "the" are intended to include the plural forms as well, unless the context clearly indicates otherwise.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Figure 1:
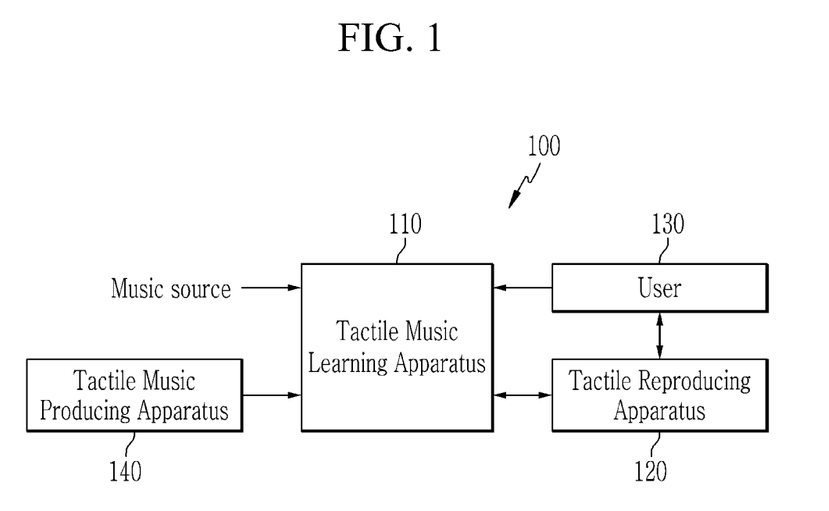
FIG. 1 is a block diagram showing an example of a tactile music system according to an embodiment.

FIG. 1 is a block diagram showing an example of a tactile music system according to an embodiment.

Referring to FIG. 1, a tactile music system 110 includes a tactile music learning apparatus 110 and a tactile reproducing apparatus 120.

The tactile music learning apparatus 110 converts sound of music content and sound of a user's voice into tactile data, respectively, and synchronizes the tactile data converted from the sound of the music content and the tactile data converted from the sound of the user's voice to generate a tactile pattern. The tactile music learning apparatus 110 may receive the music content from various music sources. For example, the tactile music learning apparatus 110 may receive the music content from a music source, for example, a music or video streaming service, or may receive the music content directly from a user 130. In some embodiments, the tactile music learning apparatus 110 may receive sound of a musical instrument played by the user instead of the user's voice.

In some embodiments, the tactile music learning apparatus 110 may receive tactile music including tactile data. To this end, the tactile music system 110 may further include a tactile music producing apparatus 140. The tactile music producing apparatus 140 may compose tactile music by converting sound of the existing music content into tactile data or by producing new music using tactile sensation. The tactile music producing apparatus 140 may produce educational content using the tactile music. In tactile music, tactile data may be synchronized with sound data.

The tactile reproducing apparatus 120 transfers the tactile pattern generated by the tactile music learning apparatus 110 to the user 130. In some embodiments, the tactile reproducing apparatus 120 may transfer the user's voice to the tactile music learning apparatus 110. In some embodiments, various including a vibration actuator and a microphone may be used as the tactile reproducing apparatus 120.

Figure 2:
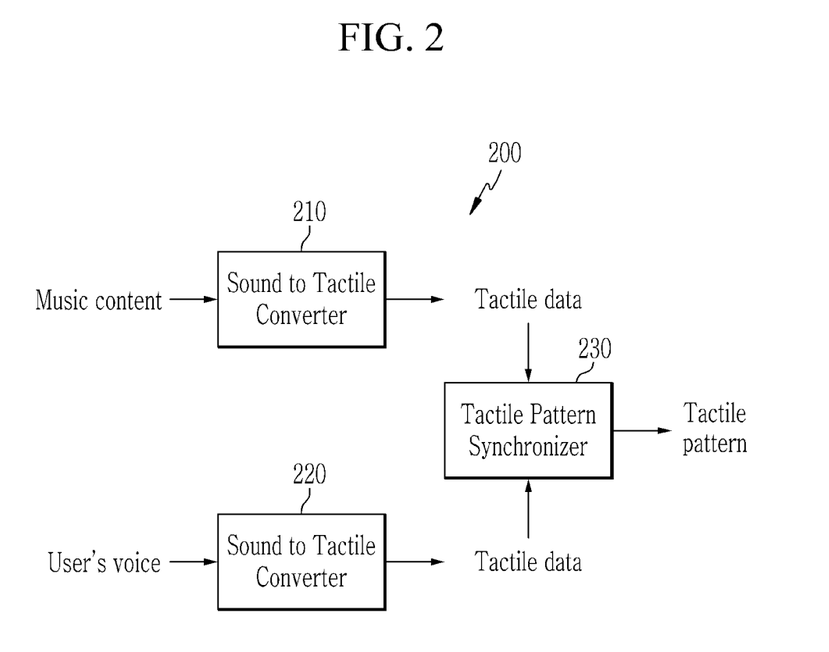
FIG. 2 is a block diagram showing an example of a tactile music learning apparatus according to an embodiment.

FIG. 2 is a block diagram showing an example of a tactile music learning apparatus according to an embodiment.

Referring to FIG. 2, a tactile music learning apparatus 200 includes sound to tactile converters 210 and 220 and a tactile pattern synchronizer 230.

The sound to tactile converter 210 converts sound data of music content into tactile data in real time, and the sound to tactile converter 220 converts sound of a user's voice into tactile data in real time. In some embodiments, the tactile data may be information indicating a tactile sensation corresponding to a pitch of the sound. In some embodiments, the tactile data may be a tactile pattern. In some embodiments, the tactile pattern may be a pattern distinguished by a frequency, driving interval or intensity of vibration. Accordingly, since different pitches are converted into different tactile data, corresponding pitches may be discriminated by the tactile data. The tactile pattern synchronizer 230 generates a synchronized tactile pattern by synchronizing the tactile data converted in real time by the sound to tactile converter 210 with the tactile data converted in real time by the sound to tactile converter 220.

The sound to tactile converter 210 may convert sound data without tactile information received from a sound source to generate the tactile data corresponding to the pitch of the sound. In some embodiments, the sound source may include, for example, music files in various formats, or sound data from a video or music streaming service. The sound to tactile converter 220 may convert the sound of a user's voice, for example, received through a microphone to generate the tactile data corresponding to the pitch of the sound. The tactile pattern synchronizer 230 may synchronize the tactile data of original sound (i.e., the sound of the music content) and the tactile data of the sound of the user's voice in real time.

In some embodiments, the tactile music learning apparatus 200 may directly receive tactile music of the music content instead of the music content. For example, the tactile music learning apparatus 200 may receive the tactile music produced by the tactile music producing apparatus 120 to be described with reference to FIG. 1. In this case, the tactile music in which tactile data may be synchronized with sound data may be provided. Accordingly, the tactile pattern synchronizer 230 may synchronize the tactile data provided from the tactile music producing apparatus 120 with the tactile data of the sound of the user's voice based on the sound data. In this case, the acoustic-tactile conversion unit 210 does not need to convert the tactile music produced by the tactile music producing apparatus 120 into the tactile data again.

Figure 3:
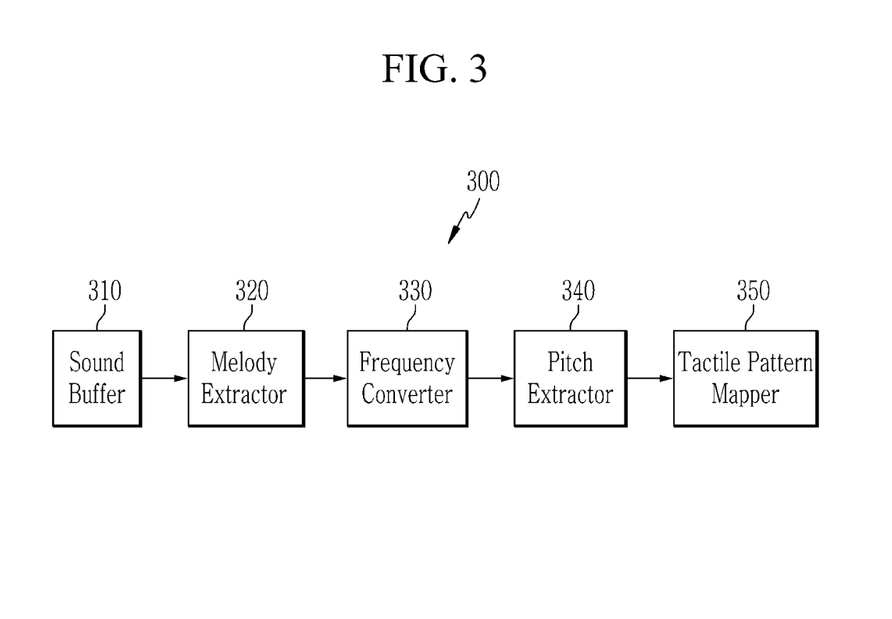
FIG. 3 is a block diagram showing an example of a sound to tactile converter in a tactile music learning apparatus according to an embodiment.
Figure 4:
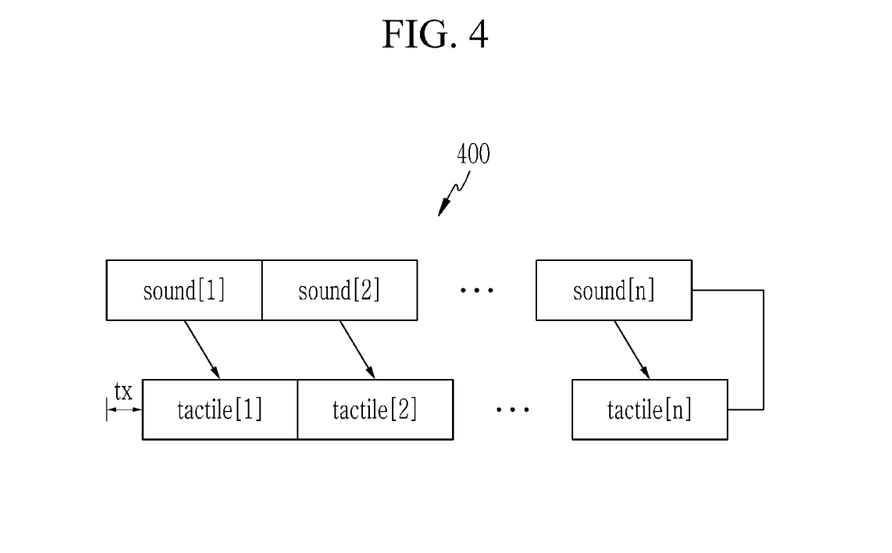
FIG. 4 is a drawing showing an example of tactile music data generated by a tactile music learning apparatus according to an embodiment.
Figure 5:
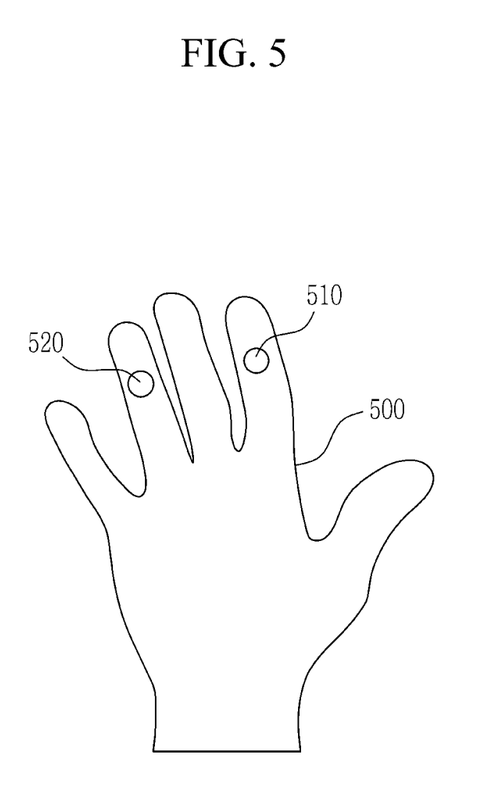
FIG. 5 and FIG. 6 are diagrams showing examples of reproduction of a tactile pattern in a tactile reproducing apparatus according to an embodiment.
Figure 6:
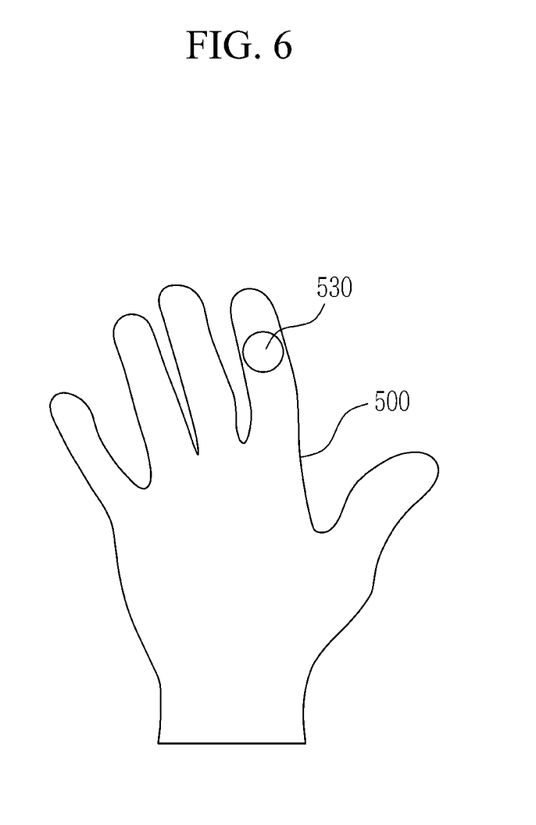

FIG. 3 is a block diagram showing an example of a sound to tactile converter in a tactile music learning apparatus according to an embodiment, and FIG. 4 is a drawing showing an example of tactile music data generated by a tactile music learning apparatus according to an embodiment. FIG. 5 and FIG. 6 are diagrams showing examples of reproduction of a tactile pattern in a tactile reproducing apparatus according to an embodiment.

Referring to FIG. 3, a sound to tactile converter 300 includes a sound buffer 310, a melody extractor 320, a frequency converter 330, a pitch extractor 340, and a tactile pattern mapper 350.

The sound buffer 310 stores sound data, which are sequentially inputted, for a predetermined time. In some embodiments, since a delay between sound and tactile sensation is determined based on the predetermined time, the predetermined time may be determined to a level that the user does not feel much. For example, the predetermined time may be determined within 20 ms.

The melody extractor 320 extracts a main melody by removing noise or accompaniment from the sound data stored in the sound buffer 310. A method for extracting the melody may be selected from various known methods, and an embodiment is not limited to the method for extracting the melody.

The frequency converter 330 converts the melody extracted from the sound data into frequency information through Fourier transform. In some embodiments, the frequency converter 330 may convert the melody into frequency information through a fast Fourier transform (FFT). The pitch extractor 340 extracts the main pitch through frequency analysis of the frequency information converted by the frequency converter 330.

The tactile pattern mapping unit 350 maps tactile data corresponding to a pitch extracted from each sound data to corresponding sound data, and stores the mapped data as tactile music data. In some embodiments, a plurality of tactile data respectively corresponding to a plurality of pitches may be predetermined and stored. In this case, the tactile pattern mapper 350 may select tactile data corresponding to the extracted pitch from among the plurality of tactile data, and map the selected tactile data to the corresponding sound data.

In some embodiments, when music content or a user's voice is serialized into a plurality of sound data (sound[1], sound[2], ..., sound[n]), tactile music data 400 may be formed as shown in FIG. 4. That is, each sound data sound[i] may be mapped with corresponding tactile data tactile[i]. In some embodiments, as described above, the tactile data tactile[i] may be generated with a delay of a predetermined time tx compared to the sound data tactile[i] which is inputted in real time.

Referring to FIG. 2 again, the tactile pattern synchronizer 230 generates synchronized tactile data, i.e., a synchronized tactile pattern, by synchronizing tactile data of the sound of the music content and the tactile data of the sound of the user's voice. The tactile pattern synchronizer 230 may design a synchronized tactile pattern so that the user can easily determine whether the pitch of the music content, i.e., the pitch of the original sound matches the pitch of his or her own voice. Accordingly, the user can determine whether the pitch of the original sound matches the pitch of the user's voice, based on the tactile pattern (e.g., vibration pattern) reproduced by the tactile reproducing apparatus in response to the synchronized tactile pattern. In some embodiments, when the pitch of the original sound does not match the pitch of the user's voice, in order for the user to distinguish the pitches, the synchronized tactile pattern may be generated such that the tactile pattern of the original sound and the tactile pattern of the user's voice are respectively reproduced. In some embodiments, when the pitch of the original sound matches the pitch of the user's voice, the synchronized tactile pattern may be generated such that a single tactile pattern is reproduced. In some embodiments, when the pitch of the original sound matches the pitch of the user's voice, the intensity may be increased in the single tactile pattern reproduced when the pitch of the original sound matches the pitch of the user's voice.

For example, as shown in FIG. 5 and FIG. 6, a glove-type apparatus may be used as a tactile reproducing apparatus 500. When the pitch of the original music does not match the pitch of the user's voice, as shown in FIG. 5, the tactile pattern of the original sound is reproduced at a location 510 which is designated as the original sound in the tactile reproducing apparatus 500, and the tactile pattern of the user's voice may be reproduced at a location 520 which is designated as the user's voice in the tactile reproducing apparatus 500. When the pitch of the original sound matches the pitch of the user's voice, as shown in FIG. 6, the single tactile pattern may be reproduced at one location 530 in the tactile reproducing apparatus 500. The position 530 at which the single tactile pattern is reproduced may be a position different from the positions 510 and 520 designated as the original sound and the user's voice, or may be any one of the two positions 510 and 520.

Accordingly, the user can determine how the pitch of the user's voice is different from the pitch of the original music. The single tactile pattern can be reproduced when the pitch of the user's voice is matches the pitch of the original sound. Accordingly, when the user sings in tune, the user can feel strongly only the single tactile pattern and can recognize the song as good.

Figure 7:
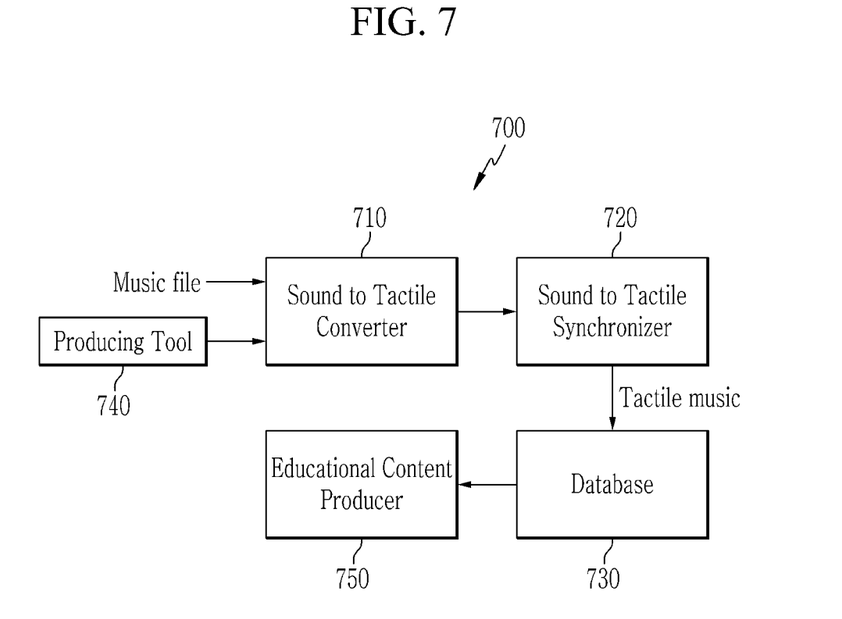
FIG. 7 is a block diagram showing an example of a tactile music producing apparatus according to an embodiment.
Figure 8:
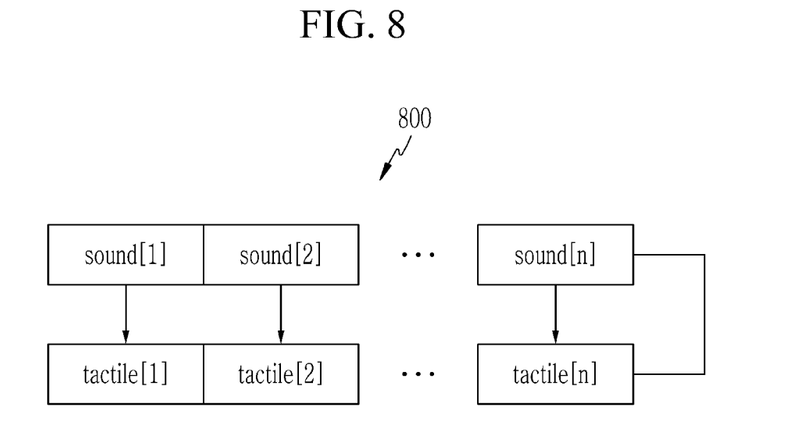
FIG. 8 is a diagram showing an example of tactile music data generated by a tactile music producing apparatus according to an embodiment.

FIG. 7 is a block diagram showing an example of a tactile music producing apparatus according to an embodiment, and FIG. 8 is a diagram showing an example of tactile music data generated by a tactile music producing apparatus according to an embodiment.

Referring to FIG. 7, a tactile music producing apparatus 700 includes a sound to tactile converter 710, a sound to tactile synchronizer 720, and a database 730.

The sound to tactile converter 710 extracts a pitch from sound data of music content and converts the extracted pitch into corresponding tactile data. In some embodiments, the music content may include a music file or sheet music, or the like. In some embodiments, the sound to tactile converter 710 may operate similarly to the sound to tactile converter described with reference to FIG. 3, except that it is not necessary to convert the sound data into the tactile data in real time. In some embodiments, since it is not necessary to convert the sound data into the tactile data in real time, the sound to tactile converter 710 may extract the pitch from the sound data of the music content by using a precise algorithm.

The sound to tactile synchronizer 720 synchronizes the generated tactile data with the sound data of the music content, and stores the synchronized data in the database 730 as tactile music data. The sound to tactile synchronizer 720 may synchronize a time point of the sound with a time point of tactile sensation. In some embodiments, when a music file is serialized into a plurality of sound data (sound[1], sound[2], ..., sound[n]), tactile music data 800 may be formed a shown in FIG. 8. That is, each sound data sound[i] may be mapped with corresponding tactile data tactile[i]. In this case, unlike the real-time sound to tactile conversion described with reference to FIG. 4, the tactile data tactile[i] may be accurately mapped with the sound data sound[i] without a delay.

In some embodiments, the tactile music producing apparatus 700 may provide a producing tool 740 to directly compose and provide music content suitable for learning tactile music. It is possible to generate a new tactile sound that does not exist in the past through the producing tool 740. In this case, the sound to tactile conversion may be performed based on the sheet music without converting the sound data into the tactile data. The tactile music stored in the database 730 may be provided at the request of the tactile music learning apparatus.

In some embodiments, the tactile music producing apparatus 700 may further include an educational content producer 750. The educational content producer 750 may provide an interface through which a music educator can compose educational content by using the tactile music stored in the database 730. For example, a music teacher may compose music of a music curriculum at a corresponding grade level as educational content for hearing-impaired persons and provide the educational content to the hearing-impaired persons.

In some embodiments, the tactile music producing apparatus 700 may be connected to a tactile music learning apparatus through a communication interface.

Figure 9:
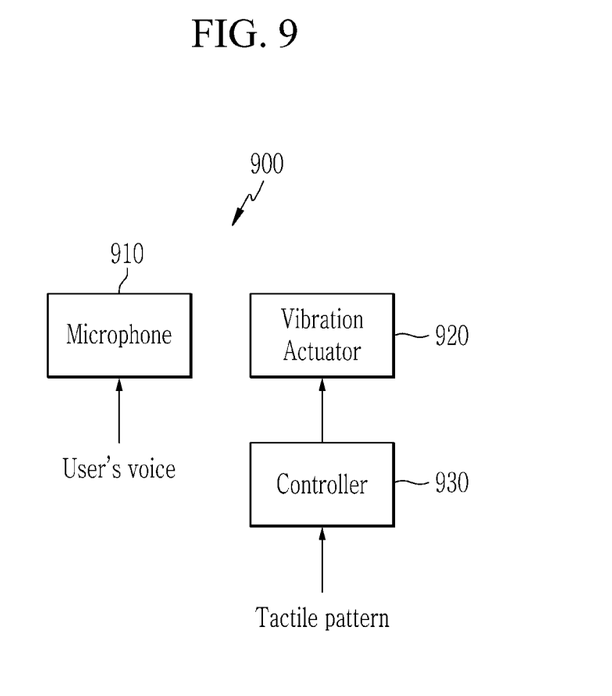
FIG. 9 is a block diagram showing an example of a tactile reproducing apparatus according to an embodiment.

FIG. 9 is a block diagram showing an example of a tactile reproducing apparatus according to an embodiment.

Referring to FIG. 9, a tactile reproducing apparatus 900 includes a microphone 910, a vibration actuator 920, and a controller 930.

The microphone 910 is provided to obtain a user's voice data to be provided as an input of a tactile music learning apparatus. In some embodiments, the tactile reproducing apparatus 900 may use an external microphone without including the microphone 910. For example, when the microphone is attached to the tactile music learning apparatus, the microphone of the tactile music learning apparatus may be used. Further, a separate microphone may be connected to the tactile music learning device.

The controller 930 controls the vibration actuator 920 in response to the synchronized tactile pattern provided by the tactile music learning apparatus. The vibration actuator 920 generates vibration corresponding to a synchronized tactile pattern under the control of the controller 930.

The tactile reproducing apparatus 900 shown in FIG. 9 is an example, and an embodiment is not limited thereto, and various tactile reproducing apparatuses capable of reproducing a tactile pattern may be used.

In some embodiments, the tactile reproducing apparatus 900 may be connected to a tactile music learning apparatus through a communication interface. In some embodiments, the tactile reproducing apparatus 900 may be included in the tactile music learning apparatus.

Next, a method of learning tactile music according to embodiments is described with reference to FIG. 10.

Figure 10:
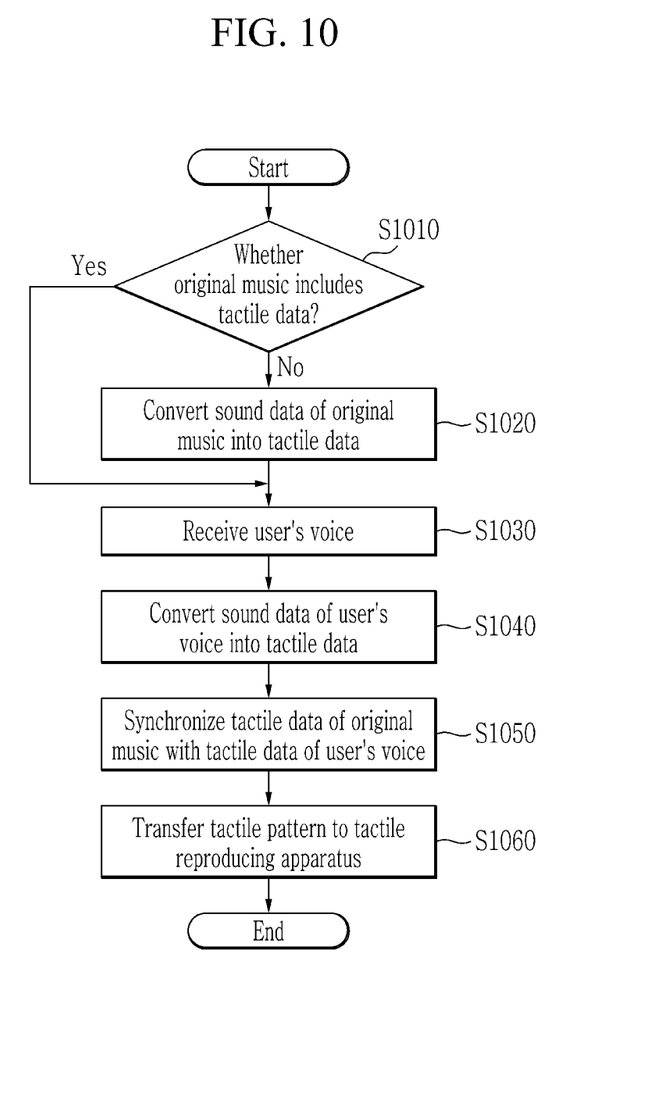
FIG. 10 is a flowchart showing an example of a tactile music learning method according to an embodiment.

FIG. 10 is a flowchart showing an example of a tactile music learning method according to an embodiment.

Referring to FIG. 10, a tactile music learning apparatus may convert sound data of original music into tactile data at step S1020. In some embodiments, when the original music is tactile music including the tactile data, the tactile music learning apparatus may not perform the process S1020 of converting the sound data of the original music into the tactile data. In some embodiments, the tactile music learning may determine whether the original music is the tactile music including the tactile data at step S1010, and then determine whether to perform the process S1020 of converting the sound data of the original music into the tactile data, based on the determination result. Further, the tactile music learning apparatus receives sound of a user's voice from the user at step S1030, and converts sound data of the user's voice into tactile data at step S1040.

The tactile music learning apparatus generates a synchronized tactile pattern by synchronizing the tactile data of the original music with the tactile data of the user's voice at step S1050. The tactile music learning apparatus transfers the synchronized tactile pattern to a tactile reproducing apparatus, and the tactile reproducing apparatus reproduces the synchronized tactile pattern at step S1060.

Next, examples in which a tactile music system according to various embodiments is used are described.

For example, content of a tactile music system may be provided through an Internet protocol television (IPTV) network. In this case, a tactile music learning apparatus may be mounted in an IPTV set-top box, and sound data of tactile music produced by a tactile music producing apparatus can be reproduced through a television. The tactile music learning apparatus mounted in the set-top box may convert the sound data of the user's voice into tactile data, and synchronize the converted tactile data with the tactile data of the tactile music produced by the tactile music producing apparatus to generate a tactile pattern. Further, a function of the tactile reproducing apparatus may be mounted in a remote controller, and the tactile pattern may be reproduced through the remote controller. Accordingly, it is possible to provide a music learning environment at home to a hearing-impaired person.

As another example, a karaoke system or a karaoke application of a smartphone may be used. In this case, a function of the tactile music learning apparatus may be installed in the karaoke system or the smartphone, and a function of the tactile reproducing apparatus may be installed in the microphone. Then, the tactile music learning apparatus may convert existing music content and sound data of a user's voice received through a microphone into tactile data to generate a synchronized tactile pattern, and reproduce the tactile pattern through the microphone. Accordingly, it is possible to build a karaoke system that the hearing-impaired person can enjoy.

As yet another example, a tactile music system may be used in a music class for the hearing-impaired person. In this case, educational content may be produced from sheet music of a music curriculum through a tactile music producing apparatus, and a function of the tactile music learning apparatus may be mounted in a smartphone. Then, the hearing-impaired person can perform the music class without a special teacher by using the tactile music learning apparatus and a tactile reproducing apparatus. Further, instead of the user's voice, performance sound of a musical instrument played by the hearing-impaired person may be used as the sound data.

As still another example, a tactile music system can be used in cultural projects for the hearing-impaired person. In this case, a tactile music producing apparatus may reproduce tactile music from music content used in a performance or music content used in a movie, and a function of the tactile music learning apparatus may be installed in a smartphone. Then, the hearing-impaired person can feel the music as tactile sensation by using the tactile music learning apparatus and a tactile reproducing apparatus.

Next, an example computing device for implementing a tactile music learning apparatus or a tactile music learning method according to embodiments is described with reference to FIG. 11.

Figure 11:
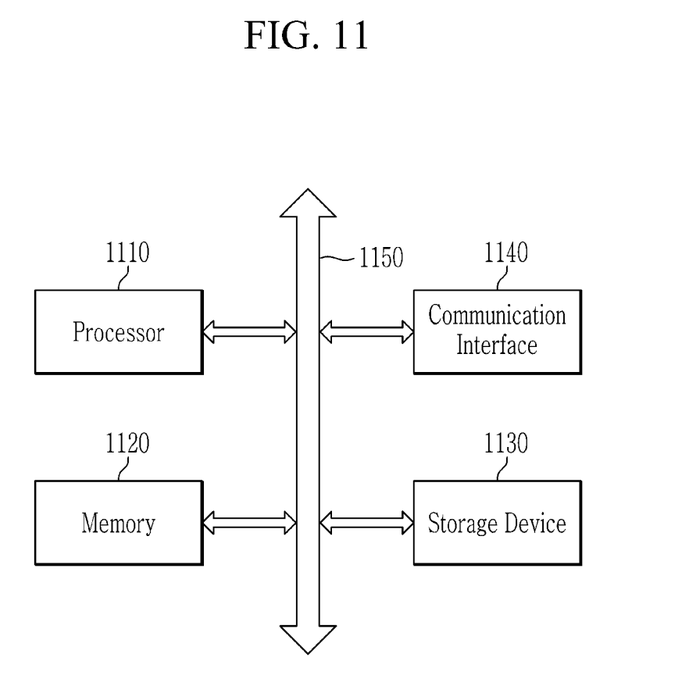
FIG. 11 is a diagram showing an example of a computing device according to an embodiment.

FIG. 11 is a diagram showing an example of a computing device according to an embodiment.

Referring to FIG. 11, a computing device includes a processor 1110, a memory 1120, a storage device 1130, a communication interface 1140, and a bus 1150. The computing device may further include other general components.

The processor 1110 control an overall operation of each component of the computing device. The processor 1110 may be implemented with at least one of various processing units such as a central processing unit (CPU), a microprocessor unit (MPU), a micro controller unit (MCU), and a graphic processing unit (GPU), or may be implemented with a parallel processing unit. Further, the processor 1110 may perform operations on a program for executing a tactile music learning method, functions of a tactile music learning apparatus, or functions of a tactile music producing apparatus described above.

The memory 1120 stores various data, instructions, and/or information. The memory 1120 may load a computer program from the storage device 1130 to execute the tactile music learning method, functions of the tactile music learning apparatus, or functions of the tactile music producing apparatus. The storage device 1130 may non-temporarily store the program. The storage device 1130 may be implemented as a non-volatile memory.

The communication interface 1140 supports wireless communication of the computing device.

The bus 1150 provides a communication function between components of the computing device. The bus 1150 may be implemented as various types of buses such as an address bus, a data bus, and a control bus.

The computer program may include instructions that cause the processor 1110 to perform the tactile music learning method, the functions of tactile music learning apparatus, or the functions of the tactile music producing apparatus when loaded into the memory 1120. That is, the processor 1110 may perform the tactile music learning method, the functions of tactile music learning apparatus, or the functions of the tactile music producing apparatus by executing the instructions.

The tactile music learning method, the functions of tactile music learning apparatus, or the functions of the tactile music producing apparatus may be implemented as a computer-readable program on a computer-readable medium. In some embodiments, the computer-readable medium may include a removable recording medium or a fixed recording medium. In some embodiments, the computer-readable program recorded on the computer-readable medium may be transmitted to another computing device via a network such as the Internet and installed in another computing device, so that the computer program can be executed by another computing device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A tactile music learning apparatus comprising:
   a memory configured store one or more instructions; and
   a processor configured to, by executing the one or more instructions:
      convert sound data of a user's voice corresponding to original music into first tactile data including tactile information;
      generate a synchronized tactile pattern by synchronizing the first tactile data with second tactile data including tactile information corresponding to sound data of the original music; and
      transfer the synchronized tactile pattern to a tactile reproducing apparatus to allow the tactile reproducing apparatus to reproduce the synchronized tactile pattern.

2. The tactile music learning apparatus of claim 1, wherein the processor is configured to convert the sound data of the original music into the second tactile data in response to the original music not including the second tactile data.

3. The tactile music learning apparatus of claim 1, wherein the processor is configured to receive the original music including the second tactile data.

4. The tactile music learning apparatus of claim 1, wherein the tactile information of the first tactile data corresponds to a pitch of the sound data of the user's voice.

5. The tactile music learning apparatus of claim 4, wherein the processor is configured to extract a main melody from the sound data of the user's voice, and extract the pitch from the main melody.

6. The tactile music learning apparatus of claim 5, wherein the processor is configured to convert the main melody into frequency information, and extract the pitch based on frequency analysis of the frequency information.

7. The tactile music learning apparatus of claim 1, wherein the processor is configured to generate the synchronized tactile pattern including a tactile pattern corresponding to the first tactile data to be reproduced at a first position of the tactile reproducing apparatus and a tactile pattern corresponding to the second tactile data to be reproduced at a second position of the tactile reproducing apparatus, in response to a pitch of the sound data of the original music not matching a pitch of the sound data of the user's voice.

8. The tactile music learning apparatus of claim 7, wherein the processor is configured to generate the synchronized tactile pattern including a tactile pattern to be reproduced at a single location of the tactile reproducing apparatus, in response to the pitch of the sound data of the original music matching the pitch of the sound data of the user's voice.

9. The tactile music learning apparatus of claim 8, wherein an intensity of the tactile pattern to be reproduced in response to the pitch of the sound data of the original music matching the pitch of the sound data of the user's voice is greater than an intensity of the tactile pattern to be reproduced in response to the pitch of the sound data of the original music not matching the pitch of the sound data of the user's voice.

10. The tactile music learning apparatus of claim 1, wherein the tactile pattern is produced by vibration in the tactile reproducing apparatus.

11. A tactile music learning method performed by a computing device, the method comprising:
   receiving sound data corresponding to original music from a user;
   converting the sound data of the user into first tactile data including tactile information;
   generating a synchronized tactile pattern by synchronizing the first tactile data with second tactile data including tactile information corresponding to sound data of the original music; and
   transferring the synchronized tactile pattern to a tactile reproducing apparatus to allow the tactile reproducing apparatus to reproduce the synchronized tactile pattern.

12. The method of claim 11, further comprising converting the sound data of the original music into the second tactile data in response to the original music not including the second tactile data.

13. The method of claim 11, wherein generating the synchronized tactile pattern includes generating the synchronized tactile pattern including a tactile pattern corresponding to the first tactile data to be reproduced at a first position of the tactile reproducing apparatus and a tactile pattern corresponding to the second tactile data to be reproduced at a second position of the tactile reproducing apparatus, in response to a pitch of the sound data of the original music not matching a pitch of the sound data of the user's voice.

14. The method of claim 13, wherein generating the synchronized tactile pattern includes generating the synchronized tactile pattern including a tactile pattern to be reproduced at a single location of the tactile reproducing apparatus, in response to the pitch of the sound data of the original music matching the pitch of the sound data of the user's voice.

15. The method of claim 14, wherein an intensity of the tactile pattern to be reproduced in response to the pitch of the sound data of the original music matching the pitch of the sound data of the user's voice is greater than an intensity of the tactile pattern to be reproduced in response to the pitch of the sound data of the original music not matching the pitch of the sound data of the user's voice.

* * * * *